United States Patent Office 3,395,228
Patented July 30, 1968

3,395,228
METHODS OF CONTROLLING PECAN BUNCH DISEASE WITH TRIPHENYL TIN COMPOUNDS
Amon D. Dacus, Shreveport, La., assignor to Thompson-Hayward Chemical Company, Kansas City, Mo., a corporation of Delaware
No Drawing. Filed Oct. 10, 1966, Ser. No. 585,288
6 Claims. (Cl. 424—288)

ABSTRACT OF THE DISCLOSURE

This invention relates to a method of controlling pecan bunch disease which comprises treating non-resistant pecan trees exposed to pecan bunch disease with an effective amount of a compound of the formula;

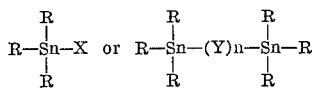

wherein each R is phenyl, halophenyl or alkoxyphenyl; X is halogen, hydroxy, acyloxy, sulfate, borate, paratoluene sulfonate, or ethylene-bis-thiocarbonate; $n$ is one or two; and Y is oxygen or sulfur.

---

This invention relates to a novel method of controlling certain plant diseases and to new compositions useful therefor. More particularly, this invention relates to a new method of treating and controlling a disease of plants known as pecan bunch disease and to novel compositions useful in the practice thereof.

Over a period of at least the last thirty years, bunch disease has ruined many pecan orchards. Infested areas have increased in size and many new infestations have been found in many of the states wherein pecans are grow. In some areas, the disease is so severe that profitable growing of susceptible varieties of pecan trees has been prevented.

Pecan bunch disease is characterized by bunching or brooming of shoots caused by forcing of lateral buds. Brooming may be noted at any time of the year, but is outstanding conspicuous in spring because foliage develops sooner on diseased branches than on normal. The leaflets on diseased branches may be yellowish but are not striped, are broader than normal for their length, and are thin, wavy, and flexible. Severely bunch-diseased branches produce no nuts, but the remainder of the tree may produce a normal crop. One or all branches on a tree may be bunch diseased, and fully diseased trees become chlorotic and weak and finally die.

Differences in varietal susceptibility to bunch disease are so great that nearly all trees of highly susceptible varieties in a mixed planting may become affected before any or the less susceptible varieties show symptoms. Pecan trees of the Mahan variety are outstandingly susceptible; Schley, Western Schley, Desirable and Moore are highly susceptible; Burkett, Van Deman, Pabst and Moneymaker are susceptible; Success is usually resistant; and and Stuart usually shows no symptoms.

Partially diseased trees may remain partially diseased for twenty years without spread to neighboring trees. However, as the number of diseased branches increases, the rate of spread increases so that a relatively lightly infested orchard receiving normal cultural care may be devastated by bunch disease in a few years.

Heretofore, the only recommended control measure for pecan bunch disease has been the pruning out of diseased branches on mildly infected pecan trees after destruction of those severely affected. All severely infected pecan trees in the orchard and all infected native pecan trees near the orchard had to be destroyed and the stumps treated with a herbicide to prevent regrowth. The methods heretofore employed involved great economic sacrifice and were not universally successful.

The reason for the heretofore unsuccessful control of pecan bunch disease has been the lack of knowledge of the causal agent thereof. In 1937, Cole in vol. 27, Phytopathology, pages 604–612, reported the transmission of pecan bunch disease by scion grafts and found no organism likely to cause the disease on broomed pecan branches. He suspected that a virus was the causal agent of pecan bunch disease. Subsequent work has failed to identify the causal agent of the disease and has equally failed to disprove the generally accepted theory that a slow moving virus is to blame.

It has now been discovered that pecan bunch disease may be effectively controlled by the practice of the instant invention. It has been found that pecan bunch disease may be controlled without the necessity of sacrificing a great number of trees and thus incurring great economic loss. It has been found that pecan bunch disease may be effectively controlled by treating pecan trees usually susceptible to attack by pecan bunch disease with an effective amount of a member of the group consisting of compounds of the formulae:

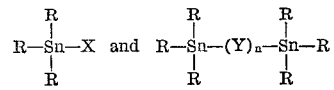

wherein each R is selected from the group consisting of phenyl, halophenyl (e.g. chlorophenyl) and alkoxyphenyl (e.g. methoxyphenyl); X is selected from the group consisting of halogen (e.g. chloro, bromo or iodo), hydroxy, acyloxy, sulfate, borate, paratoluene sulfonate and ethylene-bis-thiocarbomate; $n$ is a positive integer from one to two; and Y is selected from the group consisting of oxygen and sulfur. In the most preferable embodiment of the instant invention, each R is phenyl; X is hydroxy, halo (e.g. chloro or bromo), or acyloxy (e.g. acetoxy or propionoxy); $n$ is 1 and Y is oxygen, although the other compounds also give satisfactory results.

The preferred acyloxy radicals are those of hydrocarbon carboxylic acids of less than twelve carbon atoms, as exemplified by the lower alkanoic acids (e.g. acetic, propionic, butyric and tert. pentanoic acids); the lower alkenoic acids, the monocyclic aryl carboxylic acids (e.g. benzoic and toluic acids), the monoalicyclic aryl lower alkanoic acids (e.g. phenacetic and β-phenylpropionic acids), the cycloalkane carboxylic acids and the cycloalkene carboxylic acids. Most preferred are the acyloxy radicals derived from the alkanoic acids, for example, acetic acid and propionic acid.

Among the compounds which may be employed in the practice of this invention may be included such compounds as triphenyltin hydroxide; triphenyltin halides, for example, triphenyltin chloride, triphenyltin bromide; triphenyltin acylates, for example, triphenyltin acetate, triphenyltin butyrate, triphenyltin benzoate, triphenyltin phthalate, trichlorophenyltin hydroxide, bis-triphenyltin oxide, bis-triphenyltin sulfide, and other like triphenyltin compounds.

The satisfactory results of this invention may be obtained by treating pecan bunch susceptible trees with effective amounts of the compounds of this invention. The pecan trees may be treated by applying the compounds of this invention in the form of the compositions of this invention. The compositions of this invention comprise the compounds of this invention dispersed in a substantial amount of a suitable extending agent.

In this disclosure, the term "dispersed" is used in its widest possible sense. When it is said that the compounds of this invention are dispersed it means that the particles may be molecular in size and held in true solution in a suitable solvent. It means further that the particle may be colloidal in size and dispersed through a liquid phase in the form of suspension or emulsions or in the form of particles held in suspension by wetting agents. It also includes particles which are dispersed in a semi-solid viscous carrier, such as petrolatum or soap, in which they may be actually dissolved in the carrier or held in suspension in the carrier with the aid of suitable emulsifying or wetting agents. The term "dispersed" also means that the particles may be mixed with and spread throughout a solid carrier so that the mixture is in the form of powder or dust. The term "dispersed" also includes mixtures which are suitable for use as aerosols, including solutions, suspensions or emulsions of the agents of this invention in a carrier such as Freon which boils below room temperature at ordinary pressure.

The term "extending agent" as used in this disclosure, includes any and all of those agents in which the compounds of the instant invention are dispersed. It includes, therefore, the solvents of a true solution, the liquid phase of suspensions, emulsions or aerosols and the solid phase of dust and powders.

It has been found that the compounds of this invention are active when dispersed in an extending agent at concentrations of 0.01% by weight or even lower. This concentration is effective when the dispersing agent is a liquid, but it is preferred to use more concentrated mixtures when the dispersing agent is a semi-solid or a solid. This is because liquid dispersions which are, of course, suitable for use as sprays give a more intimate contact with the plants than the solid dispersions and, therefore, lower concentrations are more effective with liquid dispersions.

There are a number of solvents which can be utilized for the preparation of solutions, suspensions or emulsions of the compounds of this invention. High boiling oils of vegetable origin, such as castor oil or olive oil have been found to be suitable. Low boiling, more volatile solvents such as acetone, methylene chloride, and alcohols, including methanol and ethanol, benzene, toluene and the like are also useful. For certain applications it may be advantageous to resort to mixtures of solvents.

If the active agents are to be applied as aerosols, it is convenient to dissolve them in a suitable solvent and to disperse the resulting solution in a liquid such as Freon which boils below room temperature. For such applications it is better to employ true solutions of the active agent although it is possible to employ suspensions or emulsions of the active agent.

The agents of this invention are often dispersed either in the form of emulsions or suspensions, in an inert carrier with the aid of a capillary active substance. Such capillary substances may be anion-active, cation-active or non-ionizing. There may be mentioned by way of example, natural or synthetic soaps, turkey-red oil, fatty alcohol sulfonates, esters of fatty acids and the like. Other examples include high molecular weight quaternary ammonium compounds as well as condensation products of ethylene and propylene oxide with alkyl phenols or monohydric and polyhydric alchols.

For use as a powder or dust the active ingredient of this invention may be mixed with any of a number of extending agents either organic or inorganic in nature which are suitable for the manufacture of pulverulent preparations. In addition to mixing the ingredients directly, the active compounds of this invention may first be dissolved in a suitable solvent and the dry extending agents may be treated with the resulting solution so that after the solvent evaporates off the active ingredient is effectively impregnated on the extending agent. The extending agents which may be employed include, for example, tricalcium phosphate, calcium carbonate, kaolin, attapulgite, diatomite, dolomite, gypsum, pyrophyllite, montmorillonite, bole, kieselguhr, talc, calcined magnesia, boric acid and others. Materials of vegetable origin such as powdered cork, soyabean flour, powdered tobacco, ground corn cobs, powdered wood and powdered walnut shells are also useful. These mixtures may be used in the dry form or, by the addition of wetting agents, the dry powder can be rendered wettable by water so as to obtain stable aqueous dispersions suitable for use as sprays.

It has ben found that satisfactory results are obtained when the active ingredient of this invention is present in an amount of from about 1.0% to about 50.0% by weight of the final composition and most preferably in an amount of from about 10.0% to about 30.0%. Optimal results are obtained when from about 15.0% to about 25.0% by weight of the principal active ingredient is incorporated in the final product of this invention.

The compositions of this invention may be employed in the treatment of bunch disease susceptible pecan trees in any manner desired and known to the skilled worker. However, in the practice of this invention it has been found most preferable to treat the pecan trees with a spray composition containing the compounds of this invention as set forth hereinabove, although the other compositions also give satisfactory results. It has been found that satisfactory results are obtained when from about 1.0 gram to about 100.0 grams of the compound of this invention are applied per susceptible pecan tree being treated. Optimal results are obtained when from about 20.0 grams to about 40.0 grams per tree are employed in each application.

In addition to the foregoing, it should be noted that organotin substances are known to be comparatively phytotoxic. Therefore, if desired in the practice of this invention, this phytotoxicity may be reduced by the addition of certain other additives to the compositions of this invention prior to their application to the bunch disease susceptible pecan trees. Such additives as those disclosed and described in the U.S. Patent 3,140,977 may be employed for such purposes.

The invention may be further illustrated according to the following examples:

Example 1

To 740 parts of technical triphenyltin hydroxide contained in a dry blender are added 30 parts of sodium lignin sulfonate, 45 parts sulfonated aliphatic polyester and 675 parts kaolinite. After premixing, the mixture is ground in a hammer mill to a fineness of 98% minimum passing a 325 mesh screen. The resulting product is a water dispersible powder containing 50% active ingredient. The 50% wettable powder is dispersed and suspended in water to prepare a ready-to-use spray of the desired active ingredient content just prior to application to the pecan trees sought to be treated.

Example 2

A dust containing 3% by weight of the active ingredient is prepared by blending 120 parts of 50% wettable powder as described in Example 1 and 1880 parts of soapstone talc in a ribbon mixer. The dust is applied directly to the pecan trees sought to be treated.

Example 3

A flowable formulation containing 2 lbs. per gallon of active ingredient is prepared by milling to an average particle diameter of 1–3 microns by conventional method, such as ball milling or sand milling, 215 lbs. of technical triphenyltin acetate, 200 lbs. of 5% aqueous dispersion of refined isomorphous clay, 30 lbs. of alkyl aryl polyether alcohol, 10 lbs. of polyethylene glycol fatty esters, 35 lbs. of potato starch, 47 lbs. of sodium carbonate, and 463 lbs. of water.

The resulting liquid formulation is diluted with water to prepare a ready-to-use spray of the desired active ingredient content just before application to the pecan trees.

Similarly, following the procedure set forth in Example 3, but substituting an equivalent amount of triphenyltin chloride or bis-triphenyltin oxide for the triphenyltin acetate, like results are obtained.

Example 4

Five applications of the composition of Example 1, were made to one-half of a test plot of Mahan variety pecan trees so that the equivalent of 30 grams of active ingredient, triphenyltin hydroxide was applied to each tree. The remaining trees of the test plot were left untreated controls. At the end of the spraying period the incidence of pecan bunch disease was checked by visual observation and recorded for treated and untreated trees. Trees treated with the triphenyltin hydroxide composition exhibited an average of two bunch diseased branches per tree, whereas the untreated trees exhibited an average of fourteen bunch diseased branches per tree.

The invention may be variously otherwise embodied within the scope of the appended claims.

What is claimed is:

1. A method of controlling pecan bunch disease which comprises treating non-resistant pecan trees exposed to pecan bunch disease with an effective amount of a member of the group consisting of compounds of the formula:

wherein each R is phenyl; and X is selected from the group consisting of hydroxy, chloro, bromo, iodo, and acyloxy of hydrocarbon carboxylic acids of less than twelve carbon atoms.

2. A method of controlling pecan bunch disease which comprises treating non-resistent pecan trees exposed to pecan bunch disease with an effective amount of triphenyltin hydroxide.

3. The method of claim 1, wherein the compound is triphenyltin halide where the halide is selected from the group consisting of chloride, bromide and iodide.

4. The method of claim 1, wherein the compound is triphenyltin acyloxy of hydrocarbon carboxylic acids of less than twelve carbon atoms.

5. The method of claim 1, wherein the compound is triphenyltin chloride.

6. The method of claim 1, wherein the compound is triphenyltin acetate.

References Cited

UNITED STATES PATENTS

| | | | |
|---|---|---|---|
| 3,097,999 | 7/1963 | Koopmans | 167—30 |
| 3,113,009 | 12/1963 | Sijpesteijn | 167—30 |
| 3,154,531 | 12/1964 | Bruckner | 167—30 |

ALBERT T. MEYERS, *Primary Examiner.*

S. FRIEDMAN, *Assistant Examiner.*